United States Patent [19]

deMey, II

[11] Patent Number: 4,568,310
[45] Date of Patent: Feb. 4, 1986

[54] DRIVE SHAFT COUPLING DEVICE

[75] Inventor: Charles F. deMey, II, West Redding, Conn.

[73] Assignee: The Perkin-Elmer Corporation, Norwalk, Conn.

[21] Appl. No.: 590,311

[22] Filed: Mar. 16, 1984

Related U.S. Application Data

[63] Continuation of Ser. No. 349,289, Feb. 16, 1982, abandoned.

[51] Int. Cl.[4] ............................................. F16D 27/01
[52] U.S. Cl. .................. 464/29; 192/84 PM; 464/89
[58] Field of Search .............. 192/84 PM; 310/112, 310/114; 464/29, 87, 89, 91, 106, 147, 153

[56] References Cited

U.S. PATENT DOCUMENTS

| | | | |
|---|---|---|---|
| 2,153,195 | 4/1939 | Lilja | 464/29 |
| 2,214,901 | 9/1940 | Griffin | 464/29 |
| 2,300,778 | 11/1942 | Cornwell | 464/29 X |
| 2,457,647 | 12/1948 | Dodge | 464/89 X |
| 2,706,126 | 4/1955 | Thiry | 464/89 X |
| 2,929,477 | 3/1960 | Rodriguez et al. | 464/29 X |
| 3,250,089 | 5/1966 | Bruyere | 464/89 X |
| 3,296,828 | 1/1967 | Stubner et al. | 464/89 |
| 3,354,670 | 11/1967 | Fawick | 464/89 X |
| 4,033,438 | 7/1977 | Wiltsey | 464/29 X |

FOREIGN PATENT DOCUMENTS

| | | | |
|---|---|---|---|
| 1075903 | 2/1960 | Fed. Rep. of Germany | 192/84 PM |
| 2439901 | 3/1976 | Fed. Rep. of Germany | 464/29 |
| 1170098 | 1/1959 | France | 464/29 |
| 527544 | 12/1976 | U.S.S.R. | 464/29 |

Primary Examiner—Stuart S. Levy
Assistant Examiner—Daniel P. Stodola
Attorney, Agent, or Firm—E. T. Grimes; F. L. Masselle

[57] ABSTRACT

A drive shaft coupling apparatus which includes a first segment of a drive shaft, a ferromagnetic end piece mounted on one end of the first segment to provide linear play and angular flexibility with respect to the axis of rotation of the first segment, a second segment of said drive shaft, a motor for driving one of the segments of the drive shaft, a second end piece for providing a magnetic field which is mounted on one end of the second segment to provide linear play and angular flexibility with respect to the axis of rotation of the second segment, and insert for frictionally coupling the end pieces, the end pieces and the insert for frictionally coupling being arranged and dimensioned to provide a magnetic force between the end pieces sufficient to attract one end piece to the other end piece to gradually increase the rotational speed of said one end piece until it reaches the same speed as said other end piece, but insufficient to overload the motor and prevent it from turning.

4 Claims, 1 Drawing Figure

DRIVE SHAFT COUPLING DEVICE

This application is a continuation of application Ser. No. 349,289, filed Feb. 16, 1982, now abandoned.

BACKGROUND OF THE INVENTION

The present invention generally relates to a drive shaft coupling device and, in particular, relates to a coupling device which includes two shaft segments magnetically coupled to each other.

In general, drive shafts are used to transfer torque from a drive motor, or other source of rotational force, to a load. Most frequently, drive shafts are unitary, straight and designed toward a particular application or environment. However, in many instances the axis of the shaft of the motor or driving mechanism and the rotational axis of the load are misaligned, either angularly or linearly. In order to overcome such misalignment, segmented drive shafts are useful. However, as the segments are usually flexibly coupled to overcome misalignments, a major consideration becomes the efficient transfer of the driving torque to the load.

In the general field of analytical instruments, drive shaft misalignment, if not corrected or compensated for, can result in inaccurate results and/or the misleading characterization of the sample being analyzed. The difficulties of shaft misalignment in analytical instruments generally arise in the control of the light chopper which divides a single light beam into a sample beam and a reference beam. Conventional manufacturing techniques often result in the misalignment of the drive motor and the rather massive chopper. Consequently, if a unitary shaft is employed, the rotation of the chopper becomes asymmetrical, resulting in erroneous sample characterizations.

In addition to the problems resulting from shaft misalignment, the transference of torque is also a problem. That is, in analytical instruments, the size of the drive motor is maintained as small as possible for manufacturing and commercial convenience. However, this presents a problem in that the inertial mass of conventional chopper wheels is often so great that the chosen drive motor cannot bring the chopper up to speed. Thus, when switched on, the drive motor usually needs to start the chopper rotating relatively slowly, i.e., apply a comparatively large torque, to overcome the inertia and subsequently apply less torque to maintain the chopper at its operating speed. Thus, some form of a clutch mechanism is usually necessary.

One solution to the above-stated problem is described in U.S. patent application Ser. No. 128,289 filed Mar. 7, 1980, entitled "A Spectrophotometer System Having Power Line Synchronization" and assigned to the assignee hereof. As described therein, a segmented drive shaft between a motor and a chopper is coupled by means of a pair of orthogonal pins arranged to transmit torque along the shaft. These pins are necessary, since the magnetic coupling employed therein is insufficient to overcome the inertia of the chopper by itself. The magnets are ostensibly used in that design to overcome any phasing or oscillation errors during chopper rotation. This is achieved by the attracting/opposing action of poled magnets.

Although the arrangement thus described overcomes many of the recognized difficulties, it has, in itself, numerous drawbacks. One such drawback is that the mechanical pin connection between the drive shaft segments produces a degree of bounce, as well as a considerable wear factor in the long term operation of the apparatus. Further, the magnets employed must be substantially identical in physical size and magnetic strength in order to avoid osscillations or bouncing during operation. This results in an unnecessary expense.

SUMMARY OF THE INVENTION

Accordingly, it is one object of the present invention to provide a drive shaft coupling apparatus which overcomes shaft misalignment and allows the efficient transfer of torque between two segments of a drive shaft.

This object is accomplished, at least in part, by a drive shaft coupler having a ferromagnetic end piece on one segment of the shaft, a magnetic end piece on a second segment of the shaft and means interposed between the end pieces for providing frictional force therebetween.

Other objects and advantages will become apparent to one skilled in the art upon reading the following detailed description in conjunction with the appended drawing.

BRIEF DESCRIPTION OF THE DRAWING

The single FIGURE of the drawing, which is not drawn in scale, is a partial cross-sectional view of a drive shaft coupling apparatus embodying the principles of the present invention.

DETAILED DESCRIPTION OF THE INVENTION

Figure 1:
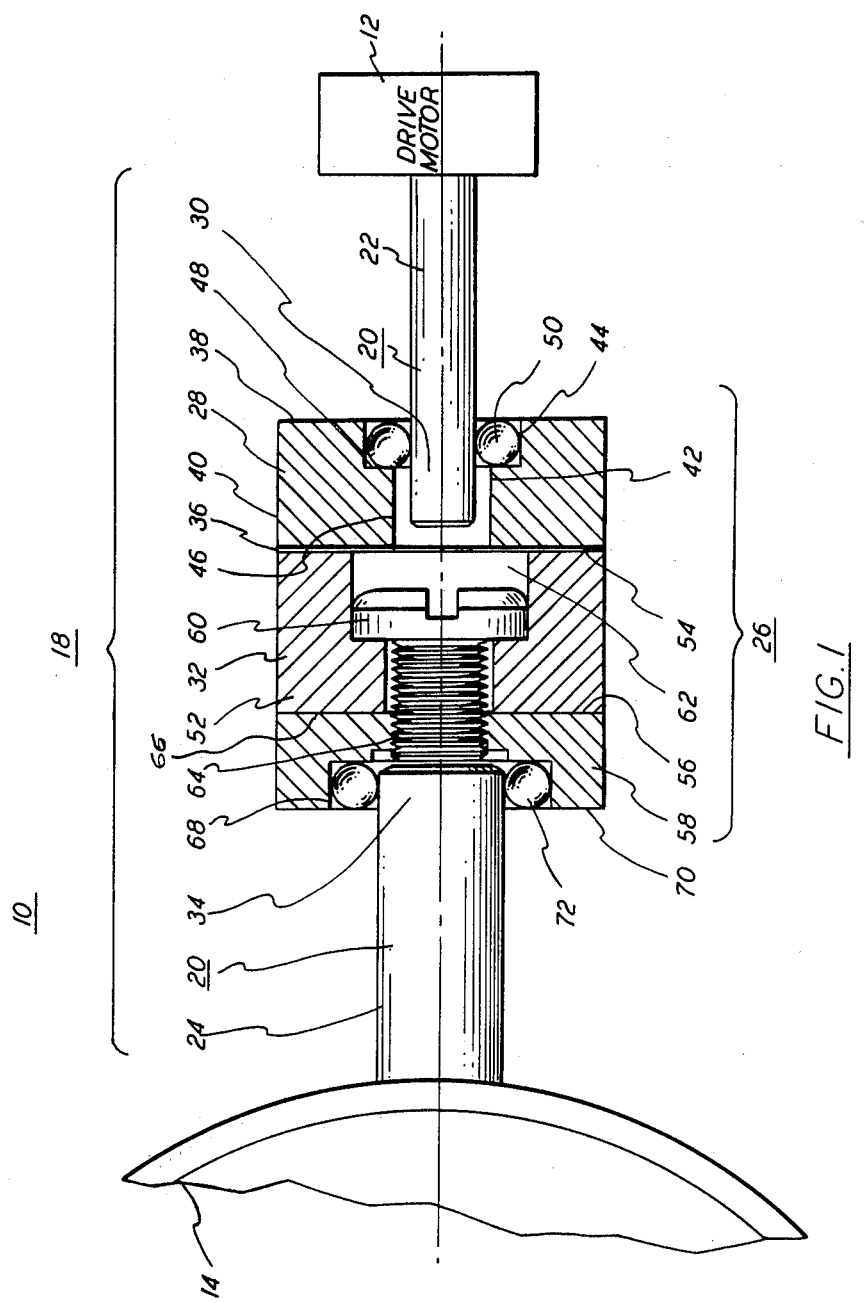

An assembly, generally indicated at 10 in the drawing, embodying the principles of the present invention, includes in one specific embodiment thereof a drive means 12 for rotating a light chopper 14. The torque developed by the drive means 12 is transmitted to the chopper 14 by means of a drive shaft coupling apparatus, generally indicated at 18 in the drawing.

The drive shaft coupling apparatus 18 includes a drive shaft 20 having a first segment 22 and a second segment 24, the first segment 22 being affixed to the drive means 12 in such a fashion that it rotates in response thereto. The second segment 24 is rigidly affixed to the light beam chopper 14 such that rotation of the second segment 24 causes the chopper 14 to rotate therewith.

The transference of the torque generated in the first segment 22 to the second segment 24 is achieved by a shaft coupler/clutch mechanism 26. The mechanism 26 includes a first end piece 28 flexibly affixed to one end 30 of the first segment 22, a second end piece 32 flexibly affixed to one end 34 of the second segment 24 and means 36 for frictionally coupling the first and second segments, 22 and 24 respectively. Preferably, the frictional coupling means 36 is interposed between the first and second end pieces, 28 and 32 respectively.

In the preferred embodiment the first end piece 28 is a cylinder of ferromagnetic material, such as, for example, iron, first and second major opposing circular faces, 38 and 40 respectively. The end piece 28 includes a bore 42 therein having a first section 44 having a comparatively larger diameter and terminating at the first major surface 38 thereof and a second section 46 having a comparatively smaller diameter, a shoulder 48 being formed at the interface of the first and second sections, 44 and 46, of the bore 44.

Although the first end piece 28 can be mounted upon the one end 30 of the first segment 22 by any flexible mounting technique known in the art, it is preferred that an appropriately sized "O-ring" 50 be mounted over the one end 30 of the first segment 22. The choice of O-ring 50 is such that it is in a state of compression when, together with the one end 30, it is inserted into the first section 44 of the bore 42. Thus, the diameter of the first section 44 of the bore 42 is cooperatively sized to accept the O-ring 50 and the depth of the first section 44 is such as to fully encase the O-ring 50 when the O-ring 50 rests upon the shoulder 48. The second section 46 of the bore 42 is dimensioned so that the portion of the one end 30 of the first segment 22 extends thereinto with sufficient clearance therearound so as to permit flexing of the first segment 22 shaft of the shaft 20 with respect to the first end piece 28.

Preferably, the second end piece 32 is a magnetic cylinder 52 having first and second major opposing circular surfaces, 54 and 56 respectively, mounted to an end piece interface block 58. The magnetic cylinder 52 can be attached to the interface block 58 by any means known in the art, for example by passing a threaded screw 60 through a clearance opening 62 in the magnetic cylinder 52 and into a threaded opening 64 in the one end 66 of the block 58. Preferably, the block 58 includes a comparatively larger diameter bore 68 in the face 70 thereof. Preferably, in a manner similar to that described above, with respect to flexibly mounting the first end piece 28 to one end 30 of the first segment 22 of the drive shaft 20, the second segment 24 is flexibly mounted, via an O-ring 72, in the interface block 58.

The flexibly mounted first and second end pieces are mounted in such a position that the frictional coupling means 36 operates as a slip clutch. This action is achieved primarily because the flexible mounting, i.e., via O-rings 50 and 72, not only provide angular flexibility with respect to the axis of rotation of the drive shaft 20, but include sufficient linear "play" introduced by the resilient property of the O-rings 50 and 72.

In one specific embodiment, the first segment 22 of the drive shaft 20 is a rigid rod having a diameter of about 0.32 cm and the diameter of the first section 44 of bore 42 is about 0.64 cm. It has been found that an O-ring 50 having an inside diameter of about 0.29 cm and an outside diameter of about 0.67 cm provides the desired compression retention of the first segment 22 of the shaft 20 to the first end piece 28, as well as allowing the desired flexibility to compensate for the usual misalignment.

In this same embodiment, the second segment 24 of the drive shaft 20 is a rigid rod having a diameter of about 0.48 cm. The second segment 24 is thus flexibly mounted in the bore 68 of the block 58 by way of an O-ring 72 having an inside diameter of about 0.45 cm and an outside diameter of about 0.80 cm.

The frictional coupling means 36 is a disk of Mylar, a registered trademark of the DuPont Corporation, or a similar material, having a thickness of about 0.02 cm. Preferably, the disk is purchased, for example, with an adhesive already applied to one surface thereof, although conventional adhesives could be used to mount the disk on the second major surface 40 of the first end piece 28.

In operation, the mechanisms 26 permits the drive means 12 to quickly attain its selected operating speed without undue drag. While attaining operating speed, the frictional force between the coupling means 36 and the first major surface 54 of the magnetic cylinder 52 begins to overcome the inertia of the chopper 14 but nevertheless slips to prevent overloading of the drive means 12. After the drive means 12 reaches operating speed, the chopper 14 is gradually brought up to the same speed. That is, once the static inertia of the chopper 14 is overcome, the torque required to increase the rotational speed thereof is reduced. The torque required, once the drive means 12 and the chopper 14 are rotating at equal speeds, to maintain the speed of the chopper 14 is relatively small and certainly less than the frictional force between the means 36 and the surface 54 of the magnetic cylinder 52.

Throughout the operation of the assembly 10, the magnetic force between the end pieces 28 and 32 can be likened to that of a spring. For example, the magnetic force is chosen so as to attract the first end piece 28 toward the cylinder 52 but is not so great as to overload the drive means 12 and prevent it from turning. Thus, in this specific embodiment, when the first end piece 28 is a cylinder of iron and having a diameter of about 1.3 cm and wherein the means 36 is a Mylar disk having a thickness of about 0.2 cm, a magnetic cylinder 52, having an outside diameter of about 1.3 cm and a clearance opening 62 of about 0.5 cm provides a magnetic field well within the desired functional range. However, unlike a spring, the magnetic force between the end pieces, 28 and 32, remains constant, or increases, as the faces thereof and the disk 36 wears thinner. A spring, of course, would "unload" and thus reduce the force, and thus the transferred torque, between the end pieces 28 and 32. Additionally, the magnetic force can be regulated by varying the thickness of the disk 36. Thus, if a lesser binding force, i.e., a lesser torque transference, between the end pieces, 28 and 32, is desired, a thicker disk 36 can be used.

Thus, by its simplicity alone, the apparatus 18 provides significant advantages over prior art devices. A further advantage is the torque range required from the drive means 12 is broadened and specifically a less powerful motor can be used in an analytical instrument, thus saving space and expense. Another advantage is the absence of bouncing and/or oscillations during the operation of the instrument. This stems from the fact that once the chopper 14 and the means 12 are rotating at the same speed, the frictional force between the end pieces, 28 and 32, is of sufficient strength that synchronous rotation thereof is maintained.

Further, due to the flexibility of the O-ring mounting, the proximate faces, 40 and 56, of the end pieces, 28 and 32 respectively, are substantially parallel and axially aligned. Thus, the magnetic forces between the faces, 40 and 56, is uniform thereover, and maximum torque transfer therebetween is achieved.

Still another advantage is that, by the described flexible mounting of the first and second end pieces, 28 and 32 respectively, to the first and second segments, 22 and 24 respectively, of the drive shaft 20 any conventional misalignment, both angular and linear, thereof is fully compensated for by the apparatus 18.

The foregoing description relates to a preferred embodiment of the present invention and other embodiments or modifications can be made without departing from the scope of the invention. Thus, the above description is considered exemplary and not limiting and the present invention is defined as set forth in the appended claims and the reasonably interpretation thereof.

I claim:

1. A drive shaft coupling apparatus comprising, in combination:

a first segment of a drive shaft;

a ferromagnetic end piece, means for mounting said ferromagnetic end piece on one end of said first segment to provide therebetween linear play and angular flexibility with respect to the axis of rotation of said first segment;

a second segment of said drive shaft;

drive means for driving one of said segments of said drive shaft;

a second end piece in the form of a permanent magnet for providing a magnetic field, means for mounting said second end piece on one end of said second segment to provide therebetween linear play and angular flexibility with respect to the axis of rotation of said second segment;

magnetically permeable means for frictionally coupling said end pieces; and said end pieces and said means for frictionally coupling being arranged and dimensioned to provide a constant magnetic force for all levels of torque between the end pieces sufficient to attract one end piece to the other end piece to gradually increase the rotational speed of said one end piece until it reaches the same speed as said other end piece, but insufficient to overload said drive means and prevent it from turning.

2. Apparatus according to claim 1 wherein said drive means is a stepper motor and drives said first segment of the drive shaft, and a light chopper is fixedly connected to said second segment of said drive shaft.

3. Apparatus according to claim 1 wherein:

siad ferromagnetic end piece is substantially cylindrical and has a first major face and a second major face, said first major face being proximate said second end piece;

said second major face of said ferromagnetic end piece including a blind bore thereinto;

said one end of said first segment having an O-ring of resilient material snugly affixed thereover; and said ring of resilient material, with said one end of said first segment, being snugly affixed within said blind bore.

4. Apparatus as claimed in claim 1 wherein said second end piece comprises a magnetic cylinder and a magnetic end piece interface block, said interface block having one face fixedly attached to said magnetic cylinder and being provided with a bore on the opposite face, and wherein said means for mounting comprises an O-ring of resilient material snugly affixed over said second segment of said drive shaft and snugly affixed within said bore.

* * * * *